(12) United States Patent
Ohwaki et al.

(10) Patent No.: US 9,365,931 B2
(45) Date of Patent: Jun. 14, 2016

(54) ALUMINUM ALLOY WITH HIGH SEAWATER CORROSION RESISTANCE AND PLATE-FIN HEAT EXCHANGER

(75) Inventors: Takeshi Ohwaki, Kobe (JP); Nobuhiro Kobayashi, Kobe (JP); Koji Noishiki, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 1688 days.

(21) Appl. No.: 11/852,721

(22) Filed: Sep. 10, 2007

(65) Prior Publication Data
US 2008/0283228 A1    Nov. 20, 2008

(30) Foreign Application Priority Data
Dec. 1, 2006    (JP) ................ 2006-325789

(51) Int. Cl.
| | |
|---|---|
| *F28D 1/04* | (2006.01) |
| *F28F 13/18* | (2006.01) |
| *F28F 19/00* | (2006.01) |
| *C23C 28/00* | (2006.01) |
| *C09D 5/08* | (2006.01) |
| *C23F 11/167* | (2006.01) |
| *F28F 19/04* | (2006.01) |
| *F28F 21/08* | (2006.01) |

(52) U.S. Cl.
CPC ............ *C23C 28/00* (2013.01); *C09D 5/086* (2013.01); *C23F 11/1676* (2013.01); *F28F 19/04* (2013.01); *F28F 21/084* (2013.01); *Y10T 428/263* (2015.01)

(58) Field of Classification Search
USPC .............................................. 165/133, 134.1
See application file for complete search history.

(56) References Cited

U.S. PATENT DOCUMENTS

| | | | |
|---|---|---|---|
| 4,503,099 A | | 3/1985 | Chang et al. |
| 5,463,804 A | * | 11/1995 | McCleary et al. ............ 29/469.5 |
| 5,573,060 A | * | 11/1996 | Adderley et al. ............. 165/166 |
| 5,994,462 A | * | 11/1999 | Srinivasan et al. .............. 525/65 |
| 6,242,054 B1 | * | 6/2001 | Baalmann et al. ............. 427/489 |
| 6,696,106 B1 | * | 2/2004 | Schultz et al. ................. 427/496 |
| 2005/0197467 A1 | * | 9/2005 | Komiya et al. ................ 525/353 |
| 2006/0214137 A1 | | 9/2006 | Schlosser |
| 2006/0219117 A1 | * | 10/2006 | Hoshi et al. .................... 101/453 |
| 2009/0081449 A1 | * | 3/2009 | Ohwaki et al. ................. 428/334 |
| 2010/0006277 A1 | * | 1/2010 | Ohwaki et al. ................. 165/185 |

FOREIGN PATENT DOCUMENTS

| | | |
|---|---|---|
| CN | 1046121 A | 10/1990 |
| CN | 1367720 A | 9/2002 |
| GB | 2 331 942 A | 6/1999 |
| JP | 06-221783 | 8/1994 |
| JP | 08-188785 | 7/1996 |
| JP | 10-260530 | 9/1998 |
| JP | 2001-212664 | 8/2001 |
| JP | 2003-88748 | 3/2003 |
| JP | 2004-42482 | 2/2004 |
| JP | 2004-68032 | 3/2004 |
| JP | 2005-282898 | 10/2005 |
| JP | 2006-169561 | 6/2006 |

OTHER PUBLICATIONS

U.S. Appl. No. 12/469,225, filed May 20, 2009, Ohwaki et al.
Oyabuki Akihiro, et al., "Self-repairing capability of anticorrosive coating for aluminum alloys", Proceedings of JSCE Materials and Environments 2004, D-304, Apr. 26-28, 2007, 15 Pages.
U.S. Appl. No. 12/174,892, filed Jul. 17, 2008, Ohwaki, et al.
Notification of Reasons for Refusal as received in the corresponding Japanese Patent Application No. 2007-276709 dated Sep. 25, 2012 w/English Translation.

* cited by examiner

*Primary Examiner* — Allen Flanigan
*Assistant Examiner* — Jason Thompson
(74) *Attorney, Agent, or Firm* — Oblon, McClelland, Maier & Neustadt, L.L.P.

(57) ABSTRACT

An aluminum alloy for use in a plate-fin heat exchanger having a heat transfer portion with seawater as a coolant includes an organic phosphonic acid underlying coating disposed on the surface of the aluminum alloy and a fluorocarbon resin coating disposed on the organic phosphonic acid underlying coating, the fluorocarbon resin coating having an average thickness of 1 to 100 µm after drying. The aluminum alloy has improved durability of coating adhesion and excellent seawater corrosion resistance.

7 Claims, No Drawings

ALUMINUM ALLOY WITH HIGH SEAWATER CORROSION RESISTANCE AND PLATE-FIN HEAT EXCHANGER

CROSS-REFERENCE TO RELATED APPLICATIONS

This application claims the benefit of JP 2006-325789 filed Dec. 1, 2006.

BACKGROUND OF THE INVENTION

1. Field of the Invention

The present invention relates to an aluminum alloy with high seawater corrosion resistance and relates to a plate-fin heat exchanger including a heat transfer portion with seawater as a coolant, the heat transfer portion being composed of the aluminum alloy. Hereinafter, aluminum is also referred to as "Al".

2. Description of the Related Art

Aluminum alloys have high specific strength and high thermal conductivity and thus have been widely used as materials for compact lightweight heat exchangers. Typical examples of heat exchangers composed of aluminum alloys include fin-and-tube heat exchangers for use in household air conditioners and automotive radiators. Industrial plate-fin heat exchangers are composed of titanium and utilize seawater as coolants. Attempts have been made to produce plate-fin heat exchangers composed of more economical aluminum alloys.

Such plate-fin heat exchangers including heat transfer portions with seawater as coolants are exposed to stringent corrosive environments because of use in seawater environments. Thus, titanium, which has excellent corrosion resistance, is currently used. Aluminum alloys have high corrosion resistance. However, when aluminum alloys are used for such plate-fin heat exchangers in place of titanium, sufficient corrosion protection is required.

In general, examples of corrosion protection of aluminum alloys constituting such plate-fin heat exchangers include formation of anodic oxidation coatings, electrolytic protection, and formation of coatings with paint. In the case where corrosion protection is applied to heat exchangers, measures to incorporate an inhibitor into a coolant are also utilized. However, plate-fin heat exchangers are of a single pass type. That is, a coolant passes through an exchanger and is then drained out of the system. The coolant does not circulate. Thus, the corrosion protection utilizing an inhibitor is not appropriate. From the viewpoint of economy, the corrosion protection by formation of a coating is suitable.

Examples of coatings usable for aluminum alloys constituting heat exchangers include various types of inorganic, organic, and organic-inorganic hybrid coatings. These coatings are practically used. Methods of forming coatings for heat exchangers are described in, for example, Japanese Unexamined Patent Application Publication No. 2003-88748 (Patent Document 1) and Japanese Unexamined Patent Application Publication No. 2004-42482 (Patent Document 2).

Patent Document 1 discloses the formation of a polyaniline coating for an aluminum alloy not constituting a target plate-fin heat exchanger with seawater but constituting a fin-and-tube heat exchanger for use in a household air conditioner or an automotive radiator.

Patent Document 2 discloses that a coating is formed on a composite underlying coating including a boehmite treatment coating or a silicate treatment coating for an aluminum alloy constituting a fin-and-tube heat exchanger for use in a household air conditioner or an automotive radiator as in Patent Document 1 to improve adhesion.

Non-Patent Document 1 (Akihiro YABUKI, Hiroyoshi YAMAGAMI, Takeshi OWAKI, Kiyomi ADACHI, and Koji NOISSHIKI. "Self-Repairing Property of Anticorrosive Coating for Aluminum Alloy", Conference Proceedings of Material and Environment, 3-4 (2004)) discloses that an anticorrosive trifluororesin coating for a single-pass heat exchanger has self-repairing properties.

Japanese Unexamined Patent Application Publication No. 2006-169561 (Patent Document 3) discloses, as the improvement of the anticorrosive trifluororesin coating, a self-repairing anticorrosive coating for an aluminum alloy, the coating being composed of a trifluororesin containing 0.1 to 10 percent by volume of at least one element selected from zinc, titanium, manganese, aluminum, and niobium. In heat exchangers utilizing seawater as a cooling medium, surfaces of heat exchangers are fragile. This is a method of preventing the rapid expansion of a flaw due to severe corrosion by seawater if once the flaw is formed. That is, the anticorrosive trifluororesin coating containing the metal powder has self-repairing properties in which when the coating is flawed, the coating is repaired.

SUMMARY OF THE INVENTION

The coating disclosed in Patent Document 1 may be sufficient to improve the corrosion resistance of a fin-and-tube heat exchanger for use in a household air conditioner or an automotive radiator. However, in a target plate-fin heat exchanger with seawater, corrosion resistance is insufficient in a salt water environment, for example, in a seawater environment.

The anticorrosive trifluororesin coatings disclosed in Patent Document 3 and Non-Patent Document 1 have excellent seawater corrosion resistance compared with the coating disclosed in Patent Document 1 and corrosion protection, such as anodic oxidation coatings and other coatings. However, in the case where the anticorrosive trifluororesin coatings are used for target plate-fin heat exchangers with seawater, adhesion to an aluminum alloy with long-term use (adhesion durability) is disadvantageously degraded, thereby causing lack of reliability.

The problem of the degradation in adhesion (adhesion durability) to the aluminum alloy used in the target plate-fin heat exchanger utilizing seawater with long-term use occurs similarly in underlying treatment for heat exchangers for use in household air conditioners and automotive radiators as described in Patent Document 2.

Fin-and-tube heat exchangers for use in air conditioners and automotive radiators have a life of at longest ten-odd years. A corrosion resistance life required is also a relatively short time comparable to the life. However, plate-fin heat exchangers with seawater, e.g., vaporizers for a liquefied natural gas, are industrially used in plants. Thus, facilities are large and expensive. Therefore, heat exchangers and corrosion resistance are each required to have a semipermanent life of several tens of years.

With respect to corrosion resistance of plate-fin heat exchangers with seawater as coolants, the corrosion resistance being required to have a long life, adhesion of coatings to aluminum alloys is dominant over the corrosion resistance of the coatings. If coatings are detached during use, excellent anticorrosive coatings are worthless. In other words, it may be no exaggeration to say that corrosion resistance, such as seawater corrosion resistance, of plate-fin heat exchangers with seawater as coolants, the corrosion resistance being required to have a long life, is adhesion of coatings to aluminum alloys.

In the method of preventing corrosion by forming an anticorrosive trifluororesin coating directly on the surface of an aluminum alloy as described in each of Patent Document 3 and Non-Patent Document 1, adhesion to the aluminum alloy is poor. Thus, the method has a practical problem in which seawater corrosion resistance is not substantially improved.

In consideration of the above-described situation, it is an object of the present invention to provide an aluminum alloy having excellent adhesion (seawater corrosion resistance) of an anticorrosive trifluororesin coating to the aluminum alloy and to provide a plate-fin heat exchanger including a heat transfer portion that utilizes seawater as a coolant and that is composed of the aluminum alloy.

To achieve the object, an inventive aluminum alloy having excellent seawater corrosion resistance includes an organic phosphonic acid underlying coating disposed on the surface of the aluminum alloy; and a fluorocarbon resin coating disposed on the organic phosphonic acid underlying coating, the fluorocarbon resin coating having an average thickness of 1 to 100 μm after drying.

To further improve the seawater corrosion resistance of the coating, a fluorocarbon resin constituting the fluorocarbon resin coating is preferably a trifluororesin. Preferably, the trifluororesin is a chlorotrifluoroethylene/vinyl ether copolymer, and fluorocarbon resin paint for the fluorocarbon resin coating is prepared by crosslinking the chlorotrifluoroethylene/vinyl ether copolymer with an isocyanate. Furthermore, to improve coating adhesion, preferably, the fluorocarbon resin coating does not contain a metal powder.

To further improve the seawater corrosion resistance (adhesion) of the coating, preferably, the organic phosphonic acid underlying coating is composed of an organic phosphonic acid selected from methylphosphonic acid, ethylphosphonic acid, and vinylphosphonic acid.

Preferably, the aluminum alloy is used for a plate-fin heat exchanger with seawater as a coolant.

To achieve the object, a plate-fin heat exchanger having excellent seawater corrosion resistance include a heat transfer portion composed of any one of the aluminum alloys described above, the heat transfer portion utilizing seawater as a coolant.

Since an aluminum oxide film is inevitably formed on a surface of an aluminum alloy, the phrase "surface of an aluminum alloy" defined in the present invention refers substantially to "a surface of the aluminum oxide film".

In the case where coating is performed on an aluminum alloy, underlying treatment is performed in order to increase adhesion of the coating. Examples of known underlying treatment include chemical treatment, such as chromate treatment, inorganic phosphoric acid treatment, and boehmite treatment; and porous anodization. As described above, Patent Document 2 discloses a composite underlying coating including a boehmite treatment coating or a silicate treatment coating for an aluminum alloy for a fin-and-tube heat exchanger for use in a household air conditioner and an automotive radiator.

The inventors found that underlying coatings formed by chemical treatment (excluding organic phosphonic acid treatment) and porous anodization does not have the effect of improving practical adhesion (seawater corrosion resistance) of a fluorocarbon resin coating to an aluminum alloy in a salt water (seawater) environment. This includes the case where a slight adhesion-improving effect is exerted compared with adhesion when a fluorocarbon resin coating is formed directly on the surface of the aluminum alloy without underlying treatment.

The inventors also found that in most of the phosphoric acid treatments with inorganic phosphoric acids, phosphates, such as zinc phosphate, and other organic phosphoric acids, in the same way as in the above-described common underlying treatments, no practical effect of improving adhesion (seawater corrosion resistance) of a fluorocarbon resin coating to an aluminum alloy is exerted and found that only an organic phosphonic acid underlying coating has the practical effect of improving adhesion (seawater corrosion resistance) to the aluminum alloy.

The significant difference in effect in response to the type of phosphoric acid is similar to the difference in effect between the above-described common underlying treatments and is based on affinity (adhesion) for the oxide film formed on the surface of an aluminum alloy, the affinity resulting from the distinct structure of an organic phosphonic acid of the present invention, as described below.

The present invention provides the aluminum alloy having excellent adhesion (seawater corrosion resistance) of the fluorocarbon resin coating (anticorrosive coating) to the aluminum alloy and the plate-fin heat exchanger including a heat transfer portion with seawater as a coolant, the heat transfer portion being composed of the aluminum alloy.

The present invention provides the aluminum alloy having excellent adhesion (seawater corrosion resistance) of the anticorrosive trifluororesin coating to the aluminum alloy and provides the plate-fin heat exchanger including a heat transfer portion with seawater as a coolant, the heat transfer portion being composed of the aluminum alloy. The plate-fin heat exchanger including the aluminum alloy according to the present invention can be used for a long time without maintenance.

DESCRIPTION OF THE PREFERRED EMBODIMENTS

Embodiments of the present invention will be described below.

Fluorocarbon Resin Coating

The average thickness of a fluorocarbon resin coating is set in the range of 1 to 100 μm. An excessively small average thickness of the fluorocarbon resin coating reduces the seawater corrosion resistance of the coating. An excessively large average thickness reduces high thermal conductivity of aluminum, thereby degrading the heat exchange capability of the heat exchanger. Therefore, the average thickness of the fluorocarbon resin coating is set in the range above.

The average thickness of the fluorocarbon resin coating is determined as follows: the fluorocarbon resin coating is formed on the aluminum alloy and sufficiently dried. The cross section of each of 10 points of the coating is observed with an optical microscope at about ×50 to measure thickness values. Then the average thickness is calculated.

In the present invention, a metal (metal powder), such as zinc, titanium, manganese, aluminum, or niobium, described in Patent Document 3 is not included. In the case where another metal (metal powder) is substantially included in the fluorocarbon resin coating, the metal is oxidized in the coating to form an oxide, thereby probably degrading adhesion.

Type of Fluorocarbon Resin

Typical examples of a fluorocarbon resin used for the fluorocarbon resin coating include trifluororesin and tetrafluororesin. Trifluororesin having the highest adhesion to an organic phosphonic acid underlying coating and having the highest seawater corrosion resistance is preferred. Trifluororesin is also preferred from the viewpoint of workability in which trifluororesin is soluble in a relatively-low-odor low-polar solvent. Trifluororesin and tetrafluororesin containing monomeric molecules and oligomeric molecules may be used.

Trifluoroethylene, in which three of four hydrogen atoms in an ethylene molecule are substituted by fluorine atoms, is copolymerized with a copolymerizable compound, e.g., vinyl ether, acrylic, or vinyl ester, to form monomeric and oligomeric molecules of trifluororesin. Tetrafluoroethylene, in which all four hydrogen atoms in an ethylene molecule are substituted by fluorine atoms, is copolymerized with a copolymerizable compound, e.g., vinyl ether, acrylic, or vinyl ester, to form monomeric and oligomeric molecules of tetrafluororesin.

Typical examples of trifluororesin include chlorotrifluoroethylene (CTFE)/vinyl ether copolymers and chlorotrifluoroethylene/acrylic copolymers.

Fluorocarbon Resin Paint

Fluorocarbon resin paint of the present invention is prepared by crosslinking the monomeric and oligomeric molecules of trifluororesin with isocyanate groups (—N=C=O) of an isocyanate compound or siloxane groups of a siloxane compound serving as a curing agent.

In the present invention, fluorocarbon resin paint prepared by crosslinking a chlorotrifluoroethylene/vinyl ether copolymer with the curing agent, such as isocyanate or siloxane, has the highest adhesion to the organic phosphonic acid underlying coating and the highest seawater corrosion resistance, which is preferred.

The fluorocarbon resin paint as a coating solution for the surface of the aluminum alloy (organic phosphonic acid underlying coating) is prepared by adding the curing agent to the monomeric and oligomeric molecules of trifluororesin as a main component. For example, 10 to 15 parts by mass of the main component is mixed with 0.1 to 3 parts by mass of the curing agent. The mixture is diluted with a thinner, according to need, to form the coating solution.

Organic Phosphonic Acid Underlying Coating

In the present invention, in order to improve adhesion of the fluorocarbon resin coating (anticorrosive coating) to the aluminum alloy, the organic phosphonic acid underlying coating for the fluorocarbon resin paint is selected as the underlying coating (treatment) so as to improve seawater corrosion resistance.

As described above, phosphoric acids, such as inorganic phosphoric acids, phosphates, e.g., zinc phosphate, and other organic phosphoric acids, in the same way as in the above-described common underlying treatments, such as chromate treatment and boehmite treatment, do not have the practical effect of improving adhesion (seawater corrosion resistance) of a fluorocarbon resin coating (anticorrosive coating) to the aluminum alloy.

Organic phosphonic acid is an unsubstituted compound in which two hydroxyl groups are attached to the phosphorus atom. Typical examples of organic phosphonic acid include methylphosphonic acid $(CH_3P(O)(OH)_2$, ethylphosphonic acid $(C_2H_5(O)(OH)_2$, vinylphosphonic acid $(C_2H_3P(O)(OH)_2$, octylphosphonic acid $(C_9H_{17}P(O)(OH)_2$, and phenylphosphonic acid $(C_6H_5P(O)(OH)_2$.

From the viewpoint of handleability and the adhesion-improving effect, the organic phosphonic acid underlying coating is preferably composed of at least one organic phosphonic acid selected from methylphosphonic acid, ethylphosphonic acid, and vinylphosphonic acid.

Organic phosphonic acid has two OH groups. The two OH groups bind to Al and O of an oxide film $(Al_2O_3)$ inevitably formed on the aluminum alloy. The bond is a covalent bond and is very strong compared with various bonds (an ionic bond, a van der Waals bond, and a hydrogen bond). The hydrocarbon component and C—O component of the fluorocarbon resin are covalently attached to the organic component of the organic phosphonic acid during crosslinking with the curing agent, forming very strong bonds. Therefore, the fluorocarbon resin coating applied is strongly attached to the aluminum alloy with the organic phosphonic acid underlying coating, thus significantly improving adhesion of the coating.

A method for forming the organic phosphonic acid underlying coating is not particularly limited. In view that the uniformity of the underlying coating affects coating adhesion, the aluminum alloy is preferably immersed in an aqueous organic phosphonic acid solution rather than application to the surface of the aluminum alloy.

The thickness of the organic phosphonic acid underlying coating is not particularly specified. It is impossible and unnecessary to form the organic phosphonic acid underlying coating having a thickness of the order of micrometers by the method for forming the underlying coating. By employing the method for forming the underlying coating, the underlying coating has a thickness of several angstroms to several tens of several angstroms. The thickness of the underlying coating is sufficient to improve the adhesion.

Uniformity in the thickness of the underlying coating is important rather than the thickness of the organic phosphonic acid underlying coating. Preferably, the immersion in the aqueous organic phosphonic acid solution is performed under conditions described below. The concentration of the organic phosphonic acid is in the range of 0.01 to 100 g/L, the temperature of the aqueous solution is in the range of 50° C. to 100° C., and the immersion time is in the range of 1 to 120 seconds.

In the case of an excessively low organic phosphonic acid concentration, an excessively low temperature of the aqueous solution, and an excessively short immersion time, a nonuniform thickness of the underlying coating is obtained, thereby increasing the possibility of a reduction in the adhesion of the coating. In the case of an excessively high organic phosphonic acid concentration, an excessively high temperature of the aqueous solution, and an excessively long immersion time, a nonuniform thickness of the underlying coating is obtained, thereby increasing the possibility of a reduction in the adhesion of the coating. Thus, the formation of the organic phosphonic acid underlying coating is preferably performed by immersion in the aqueous organic phosphonic acid solution under the conditions described above.

Pretreatment

The aluminum alloy is subjected to pretreatment in order to form the organic phosphonic acid underlying coating and the fluorocarbon resin coating with satisfactory adhesion. As pretreatment, preferably, not only soil on the surface of the aluminum alloy is removed but also oxides and hydroxides formed on the aluminum alloy are removed to expose the surface of the aluminum metal. Specifically, the aluminum alloy is degreased and washed with a degreaser or a cleaning agent, immersed in an alkali treatment solution, such as a caustic soda solution/immersed in an aqueous solution of an acid such as nitric acid, and rinsed with deionized water. In common pretreatment, a new aluminum oxide film is inevitably formed immediately after pretreatment. The organic phosphonic acid underlying coating is formed on the oxide film.

Aluminum Alloy

Aluminum alloys that can be easily processed or formed into plates or fins and have satisfactory blazing properties may be used. Examples of types of aluminum alloy usable include 1000, 3000, 5000, 6000, and 7000 specified by JIS standards and AA standards. Plates, strips, and extruded shapes of the aluminum alloys described above may be appropriately used. Specifically, 3003 and 5052 may be suitably used.

For the aluminum alloy used, there is no need to perform any surface treatment excluding the above-described pretreatment before organic phosphonic acid underlying treatment. However, in view of corrosion from flaws of the coating caused during operation of a heat exchanger with seawater as a cooling medium, surface treatment or cladding may be performed. The surface treatment may be known chromate or boehmite treatment.

For example, to ensure comparable corrosion resistance even if flaws are formed in the coating, surface treatment or cladding may be performed so as to have a sacrificial protection effect. Specifically, a pure zinc layer or a zinc alloy layer is formed as a background layer of the organic phosphonic acid underlying coating by plating. The zinc plating layer exerts the sacrificial protection effect at the flaws in the coating. Alternatively, a zinc-rich 7000 aluminum alloy may be laminated on the surface of 3000 or 5000 aluminum alloy.

EXAMPLES

Examples of the present invention will be described below. An organic phosphonic acid underlying coating was formed on the surface of an aluminum alloy specimen having a thickness of 1.0 mm and a size of 200×200 mm. A fluorocarbon resin coating composed of trifluororesin and having a thickness of 1 to 100 μM was formed on the underlying coating. Coating adhesion was evaluated for the resulting coated aluminum alloy. Furthermore, coating adhesion was evaluated for a coated aluminum alloy according to comparative example. Table 1 shows the results.

In the present invention, durability of the coating adhesion (coating life) is evaluated as seawater corrosion resistance. Alternatively, there is an evaluation method by measuring the change in corrosion resistance of the coating with time, as described in Patent Document 3. In Patent Document 3, the corrosion resistance of the fluorocarbon resin coating is evaluated for a short time (about five days). However, even when the fluorocarbon resin coating has satisfactory corrosion resistance for such a short time, in the case where the coating is detached over short- or long term use due to low coating adhesion (coating adhesion durability), there is no point. Thus, in the present invention, coating adhesion over long-term use is evaluated as seawater corrosion resistance.

Pretreatment

As pretreatment, the above-described treatment in which soil, oxides, hydroxides, and the like formed on the surface of the aluminum alloy specimen were removed to expose the surface of the aluminum metal was performed. Specifically, the specimen was degreased and washed with a commercially available degreaser at room temperature, immersed in a treatment solution of 20 percent by mass caustic soda at room temperature for 30 seconds, immersed in an aqueous solution of 20 percent by mass nitric acid at room temperature for 30 seconds, and rinsed with deionized water.

Organic Phosphonic Acid Underlying Treatment

Organic phosphonic acid underlying treatment was performed according to the type, concentration, temperature, and immersion time shown in Table 1 to form an underlying coating on the surface of the pretreated aluminum alloy specimen. Three types of phosphonic acid, i.e., methylphosphonic acid (MPA), ethylphosphonic acid (EPA), and vinylphosphonic acid (VPA), were used.

Among comparative examples, in a comparative example without underlying treatment, the pretreated aluminum alloy specimen was coated with a fluorocarbon resin. With respect to chromate treatment, the pretreated aluminum alloy specimen was immersed in a commercially available 1% chromate treatment solution at 50° C. for 60 seconds and then washed with water. With respect to boehmite treatment, the pretreated aluminum alloy specimen was immersed in hot water having a temperature of 90° C. for 10 minutes. With respect to inorganic phosphoric acid treatment, the pretreated aluminum alloy specimen was immersed in a commercially available aqueous inorganic phosphoric acid solution at 40° C. for 10 seconds and then washed with water. With respect to zinc phosphate treatment, the pretreated aluminum alloy specimen was immersed in a commercially available zinc phosphate treatment solution at 40° C. for 120 seconds and then washed with water.

Fluorocarbon Resin Coating

The following three types of paint each including trifluororesin as a main component were used for the fluorocarbon resin coating.

A: Paint prepared by crosslinking a chlorotrifluoroethylene/vinyl ether copolymer as a main component of trifluororesin with an isocyanate curing agent.

B: Paint prepared by crosslinking a chlorotrifluoroethylene/vinyl ether copolymer as a main component of trifluororesin with a siloxane curing agent.

C: Paint prepared by crosslinking a chlorotrifluoroethylene/acrylic copolymer as a main component of trifluororesin with an isocyanate curing agent.

In each of the fluorocarbon resin paints, 13 parts of the main component was mixed with 1 part of the curing agent. The resulting mixture was diluted with a thinner at a dilution ratio of several-fold to ten-odd-fold to form a coating solution in such a manner that the average thickness was obtained. The surface of the aluminum alloy subjected to the organic phosphonic acid underlying treatment was immersed in the resulting coating solution so as to maximize the uniformity of a coating. The resulting fluorocarbon resin coating did not contain a metal powder or the like.

The coated aluminum alloy was dried at 100° C. for 2 hours to form a specimen for coating adhesion evaluation.

Thickness of Coating

To determine the thickness of the coating on the coated aluminum alloy specimen, the cross section of each of 10 points of the coating was observed with an optical microscope at about ×50 Table 1 also shows the thickness of the coating. The average thickness of the organic phosphonic acid underlying coating in each of the examples was in the range of 4 Å to 17 Å.

Comparison with the aluminum alloy not subjected to the pretreatment during the observation of the cross section of the coating showed that a new aluminum oxide film was formed by the pretreatment. Furthermore, the results demonstrated that the organic phosphonic acid underlying coating was formed on the oxide film, and the resin coating was formed on the underlying coating.

Initial Adhesion

According to JIS 5600-5-6, in order to evaluate initial adhesion of the coating, a tape peel test was performed for a specimen having flaws in the form of a grid, the number of grid sections being 100, and each of the grid sections having a size of 1 mm×1 mm. The test was performed for five specimens in each example at room temperature.

Evaluation criteria were as follows:

No detachment of the coating was observed: "Excellent"
The detachment of the coating of any of the specimens was observed in less than 10% of the grid sections: "Good"
The detachment of the coating of any of the specimens was observed in 10% to less than 30% of the grid sections: "Fair"
The detachment of the Coating of any of the specimens was observed in 30% or more of the grid sections: "Poor".

The "Excellent" and "Good" specimens were acceptable for initial adhesion.

Durability of Coating Adhesion

To evaluate durability (coating life) of coating adhesion (change with time), a corrosion acceleration test was performed with salt water, the test simulating the use of a heat exchanger with actual seawater. Specifically, according to JIS 5600-5-6, specimens each having flaws in the form of a grid was immersed in 3% salt water at 50° C. for 7 days and 28 days, the number of grid sections being 100, and each of the grid sections having a size of 1 mm×1 mm. These specimens were washed with deionized water. After water was lightly removed with cloth, the specimens were dried at 50° C. for 24 hours. Then the tape peel test was performed.

The test was performed for five specimens in each example at room temperature. Evaluation criteria were as follows:

No detachment of the coating was observed: "Excellent"
The detachment of the coating of any of the specimens was observed in less than 10% of the grid sections: "Good"
The detachment of the coating of any of the specimens was observed in 10% to less than 30% of the grid sections: "Fair"
The detachment of the coating of any of the specimens was observed in 30% or more of the grid sections: "Poor".

The "Excellent" and "Good" specimens were acceptable to durability of coating adhesion for 7 days. The "Excellent", "Good", and "Fair" specimens were acceptable for 28 days.

As is apparent from Table 1, In each of Inventive Examples 1 to 11, the organic phosphonic acid underlying coating was formed on the surface of the aluminum alloy, and the fluorocarbon resin coating having an average thickness of 1 to 100 μm after drying was formed on the underlying coating. Therefore, the aluminum alloy exhibited excellent coating adhesion (durability of coating adhesion) in the corrosion acceleration test with salt water.

The results cannot guarantee the semipermanent life of a plate-fin heat exchanger with actual seawater as a coolant. However, the coating adhesion in the inventive examples is clearly superior to that in the comparative examples for long-term use.

In contrast, in each of Comparative Example 12 to 14, the fluorocarbon resin coating was formed on the surface of the aluminum alloy without the organic phosphonic acid underlying coating. Thus, coating adhesion (durability of coating adhesion) was degraded. In other words, the aluminum alloy cannot be used for the plate-fin heat exchanger with seawater as a coolant.

In each of Comparative Example 15 to 18, the underlying coating formed by chromate treatment, boehmite treatment, inorganic phosphoric acid treatment, or zinc phosphate treatment excluding organic phosphonic acid treatment was formed. However, in particular, coating adhesion (durability of coating adhesion) over long-term use was degraded compared with those in the inventive examples in which the organic phosphonic acid underlying coating was formed. Thus, the aluminum alloy cannot be used for the plate-fin heat exchanger with seawater as a coolant.

The results demonstrate the value of the inventive aluminum alloy including the organic phosphonic acid underlying coating arranged on the surface thereof and the fluorocarbon resin coating which has a dry thickness of 1 to 100 μm and which is arranged on the underlying coating.

TABLE 1

| Category | No | Al alloy | Organic phosphoric acid underlying coating | | | | Fluorocarbon resin coating | | Corrosion resistance of coating to seawater Coating adhesion | | | |
|---|---|---|---|---|---|---|---|---|---|---|---|---|
| | | | Type of organic phosphoric acid | Concentration of organic phosphoric acid g/L | Temperature of aqueous solution °C. | Immersion time in aqueous solutions | Type of resin | Average thickness μm | Initial adhesion | Durability after 7 days | Durability after 28 days | Comprehensive evaluation |
| Inventive example | 1 | 3003 | MPA | 10 | 65 | 60 | A | 8 | ⊚ | ⊚ | ⊚ | ⊚ |
| | 2 | 3003 | EPA | 10 | 65 | 60 | A | 8 | ⊚ | ⊚ | ⊚ | ⊚ |
| | 3 | 3003 | VPA | 10 | 65 | 60 | A | 8 | ⊚ | ⊚ | ⊚ | ⊚ |
| | 4 | 3003 | EPA | 0.01 | 65 | 60 | A | 8 | ⊚ | ⊚ | Δ | ○ |
| | 5 | 3003 | EPA | 100 | 65 | 60 | A | 8 | ⊚ | ⊚ | ○ | ○ |
| | 6 | 3003 | MPA | 10 | 65 | 60 | B | 15 | ⊚ | ⊚ | ⊚ | ⊚ |
| | 7 | 5052 | EPA | 10 | 65 | 1 | A | 7 | ⊚ | ⊚ | Δ | ○ |
| | 8 | 5052 | EPA | 10 | 65 | 10 | C | 9 | ⊚ | ⊚ | ○ | ○ |
| | 9 | 5052 | EPA | 10 | 65 | 120 | A | 7 | ⊚ | ⊚ | Δ | ○ |
| | 10 | 5052 | VPA | 10 | 65 | 60 | B | 15 | ⊚ | ⊚ | ⊚ | ⊚ |
| | 11 | 5052 | VPA | 10 | 50 | 60 | C | 9 | ⊚ | ⊚ | ○ | ○ |
| Comparative example | 12 | 5052 | — | — | — | — | A | 7 | ⊚ | x | x | x |
| | 13 | 5052 | — | — | — | — | B | 15 | ⊚ | x | x | x |
| | 14 | 5052 | — | — | — | — | C | 9 | ⊚ | x | x | x |
| | 15 | 3003 | Chromate treatment | | | | A | 8 | ⊚ | ○ | x | x |
| | 16 | 3003 | Boehmite treatment | | | | A | 8 | ○ | Δ | x | x |
| | 17 | 3003 | Inorganic phosphoric acid treatment | | | | A | 8 | ⊚ | ○ | x | x |
| | 18 | 3003 | Zinc phosphate treatment | | | | A | 8 | ⊚ | ○ | x | x |

What is claimed is:

1. A plate-fin heat exchanger having excellent seawater corrosion resistance, comprising:

a heat transfer portion composed of an aluminum alloy, wherein the heat transfer portion utilizes seawater as a coolant, wherein the aluminum alloy comprises:

an organic phosphonic acid underlying coating disposed on the surface of the aluminum alloy; and a fluorocarbon resin coating disposed on the organic phosphonic acid underlying coating,
wherein the organic phosphonic acid underlying coating and the fluorocarbon resin coating are covalently bonded,
wherein the organic acid phosphonic acid underlying coating and the aluminum alloy are covalently bonded with a curing agent,
wherein the fluorocarbon resin coating has an average thickness of 1 to 100 μm after drying.

2. The plate-fin heat exchanger according to claim 1,
wherein a fluorocarbon resin constituting the fluorocarbon resin coating is a trifluororesin.

3. The plate-fin heat exchanger according to claim 2,
wherein the trifluororesin is a chlorotrifluoroethylene/vinyl ether copolymer, and
wherein fluorocarbon resin paint for the fluorocarbon resin coating is prepared by crosslinking the chlorotrifluoroethylene/vinyl ether copolymer with an isocyanate.

4. The plate-fin heat exchanger according to claim 1,
wherein the fluorocarbon resin coating does not contain a metal powder.

5. The plate-fin heat exchanger according to claim 3,
wherein the fluorocarbon resin coating does not contain a metal powder.

6. The plate-fin heat exchanger according to claim 1,
wherein the organic phosphonic acid underlying coating is composed of an organic phosphonic acid selected from methylphosphonic acid, ethylphosphonic acid, and vinylphosphonic acid.

7. The plate-fin heat exchanger according to claim 5,
wherein the organic phosphonic acid underlying coating is composed of an organic phosphonic acid selected from methylphosphonic acid, ethylphosphonic acid, and vinylphosphonic acid.

* * * * *